March 28, 1967 J. H. HUMISTON 3,310,871

METHOD OF COLLAPSING STUD BREAST

Filed April 20, 1964

INVENTOR.
John H. Humiston.
BY H. F. Johnston.

United States Patent Office 3,310,871
Patented Mar. 28, 1967

3,310,871
METHOD OF COLLAPSING STUD BREAST
John H. Humiston, Watertown, Conn., assignor to Scovill Manufacturing Company, Waterbury, Conn., a corporation of Connecticut
Filed Apr. 20, 1964, Ser. No. 360,917
6 Claims. (Cl. 29—432.2)

This invention relates to a snap fastener installation, and particularly to the method of setting a resilient stud upon a support member.

This invention particularly relates to the general type of stud member shown in FIG. 2 of the Fenton Patent 2,131,347 wherein the stud member is formed with a prong-deflecting breast or anvil portion biased outwardly and upwardly from its attached position to the stud proper. This construction permits the use of prong-attaching member shown in FIG. 3 of the above-mentioned Fenton patent for attaching the stud to a support.

One of the uses found for the above type of stud member is in connection with armor plates used in soldier's uniforms wherein the plates are relatively thick. When used in this application, it was found that the thickness of the plate was such that it would not clear the larger diameter of the stud head to a snap-locking position and therefore, could be easily detached.

It is one of the purposes of this invention to alter the height of the stud breast during the setting operation so that when the stud is inserted into a socket opening of a relatively thick plate, the socket portion of the plate can be forced over said head a sufficient distance to clear the largest diameter of said head and assure a snap-action of the interconnected parts.

Figure 1:
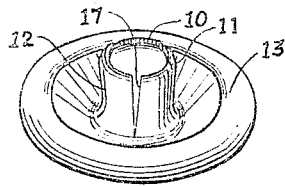
FIG. 1 is a perspective view of the stud member, per se, such as used in the process.
Figure 2:
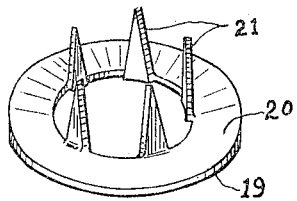
FIG. 2 is a perspective view of the prong member used in attaching the stud member to a support.
Figure 3:
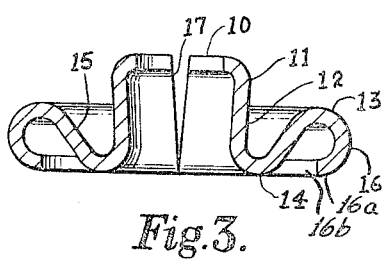
FIG. 3 is a vertical sectional view through the stud on a larger scale.

The preferred form of stud used in this process is best shown in FIGS. 1 and 3, and comprises a central post 10 in the form of a bulbous head 11 and a tapering neck 12. The central post 10 is surrounded by an annular hollow anvil breast portion 13 connected to the tapering neck 12 through a U-bend 14. The anvil breast portion 13 consists of a flat prong-deflecting surface 15 extending radially outwardly and upwardly from the U-bend portion 14 and joined to a surrounding arcuately shaped rim 16. The rim 16 terminates in an arcuate radially inwardly directed rim portion 16a spaced short of said reduced neck to define a prong-receiving opening 16b between the rim edge and the reduced neck 12. The central post 10 is slit as at 17 throughout its length so that the stud is resilient and, as will appear later, can be used with a rigid socket.

The means for attaching the stud member to a support piece 18 is a prong ring 19 consisting of an annulus 20 and several prongs 21 extending upwardly from the center opening of the annulus.

Figure 4:
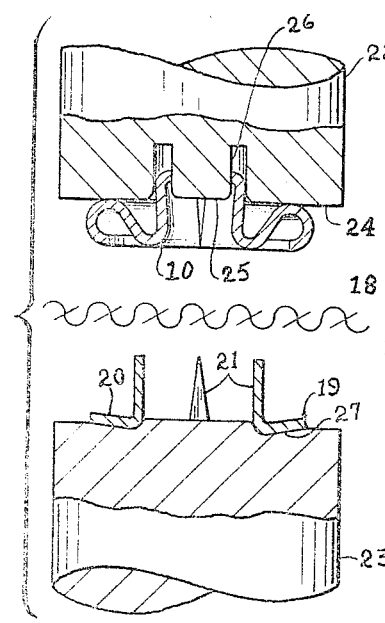
FIG. 4 is a sectional view of the fastener members and setting dies in the first stage of the process.
Figures 5, 6:
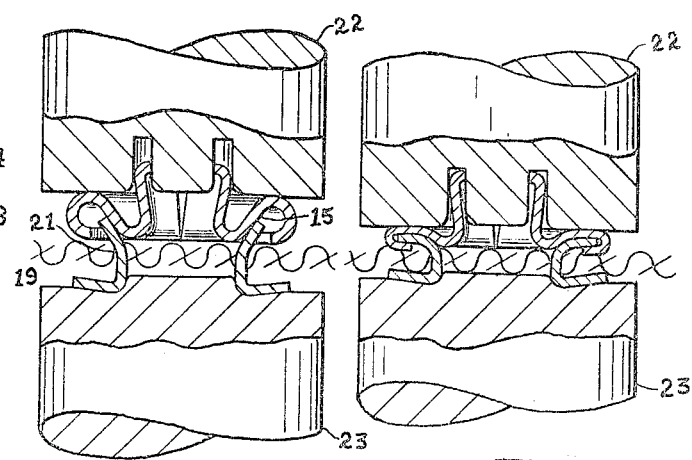
FIG. 5 is a similar view with the dies advanced to a midportion of the setting stroke.
FIG. 6 shows the setting dies at the completion of the fastener-setting operation.

The tools for assembling the stud and the prong ring to the support piece as shown in FIGS. 4, 5 and 6, consist of an upper die 22 and a lower die 23. The upper die 22 has a flat anvil face 24 that bears against the upper surface of the anvil breast portion 13. The die 22 is provided with a center pin 25 surrounded by an annular recess 26 for receiving the fingers of the resilient central post 10. The lower die 23 is formed with an annular seat 27 properly shaped to receive and centralize the annulus 20 of the prong ring 19.

Figure 7:
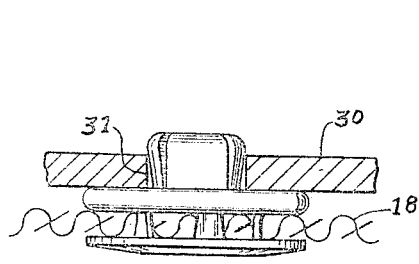
FIG. 7 is an elevational view of the completed fastener showing a socket plate member assembled thereto.
Figure 8:
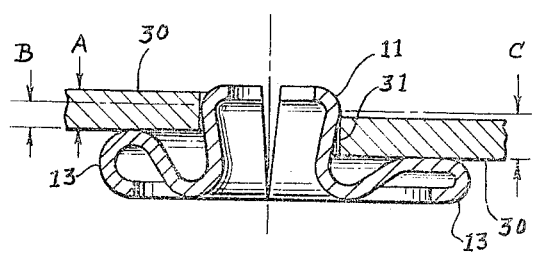
FIG. 8 is a sectional view of the stud showing the state of the stud breast before and after the setting operation.

As pointed out in the objects, the purpose of this invention is to reform the breast portion of the stud so that it can accommodate a socket member of relatively thick material. As shown in FIGS. 7 and 8, such a socket member may be in the form of a relatively thick piece of rigid material 30 usually in substantially flat form and having an opening 31 therethrough. The thickness of the rigid socket in relation to the stud in its initial state is shown in the left side of FIG. 8 wherein the socket thickness is represented by the dimension A which is somewhat greater than the distance measured from the upper surface of the breast portion 13 to the maximum diameter of the stud head as indicated by the dimension B. If the stud member were to be left in this state, it will be obvious that the socket member would not have a snap-action over the bulbous head of the stud member.

In carrying out the intent of this invention, reference is made to FIGS. 4, 5 and 6. In the first step, a prong ring 19 is positioned upon the lower die 23 and a stud member is positioned underneath the upper die 22 with the fingers of the central post resiliently engaging the die pin 25. The support piece 18 is then positioned between the two dies and properly oriented, after which, the two dies are moved toward each other by a foot-press or an automatic fastener-setting machine.

During the first part of the setting operation, the prongs 21 will pierce through a support 18 and initially deflect outwardly by contacting the deflecting surface 15 of the anvil breast portion as seen in FIG. 5. As the dies 22 and 23 move to the completion of their fastener-setting operation as shown in FIG. 6, the breast portion 13 will be forced downwardly from the position shown at the left side of FIG. 8 to the position shown at the right side of the same figure. At the same time, the breast portion rim 16 will be collapsed to a position where the rim walls substantially embrace the opposite surface of the prongs 21. Thus in the final form, the distance from the upper surface of the breast portion 13 to the maximum diameter of the stud head as indicated by dimension C, will be at least greater than the socket thickness. Thus, when the stud member is assembled into the socket opening 31, a detachable snap-action between the fastener assembled parts will be assured.

The type of stud shown in the aforementioned Fenton patent has been in use for many years on numerous types of garments. It has been a desirable fastener for certain applications in the garment industry because the stud can be fastened with a prong ring. However, due to the space occupied by the prong-deflecting breast portion, it was impractical to use the stud with a rigid socket of relative thick material. By changing the Fenton stud to a resilient stud and by resorting to the above-described method of assembly, greater use may be made of the prong ring type of attached stud.

What I claim is:

1. The method of securing a stud of a snap fastener member to a support, said stud having a bulbous head with a reduced neck and an annular hollow anvil breast portion joined to the neck opposite the head end, said breast portion comprising a first prong deflecting surface extending radially outwardly and upwardly from its neck connected portion substantially half the distance of the combined height of the neck and head, and a second arcuate radially inwardly directed rim portion which terminates short of said reduced neck to define a prong-receiving opening between said rim edge and said reduced neck, said method comprising the step of positioning the stud against one surface of said support and positioning an attaching member having a series of prongs against the opposite surface of said support, next forcing the stud and prong member together causing said prongs to pierce through said support and to be bent outwardly along said prong-deflecting surface into said hollow anvil breast portion, and finally forcing the set breast portion and prongs therein downwardly to a plane closer to the plane of said neck and anvil connected portion.

2. The method of securing a stud to a support as defined in claim 1 wherein the breast portion is collapsed or flattened to substantially embrace the opposite surfaces of said prongs.

3. The method of securing a stud and an attaching member to a support, said stud having a resilient head and tapering neck and a circumferentially continuous hollow anvil breast portion joined to said neck opposite its head end and comprising a first prong deflecting surface extending radially outwardly and upwardly substantially half the distance from the outer extremity of said head to its connected portion with said neck, and a second arcuate radially inwardly directed rim portion which terminates short of said reduced neck to define a prong-receiving opening between said rim edge and said reduced neck, ring having a series of prongs extending upwardly from its center opening, said method comprising the step of first positioning the breast end of said stud against one surface of said support and the pointed ends of said prongs against the opposite surface, next forcing the stud and attaching member to cause said prongs to pierce through said support and bend outwardly along said prong-deflecting surface into said hollow anvil breast portion, and finally forcing said anvil breast portion and prong-therein downwardly to a position where its upper surface will be in a plane closer to the connected portion of said anvil and neck.

4. The method of securing a stud and an attaching member to a support, wherein said stud is adapted for engagement into an opening of a piece of relatively thick hard material and considered the socket element of the fastener members, said stud having a resilient head and tapering neck, said stud also having a circumferentially continuous hollow anvil breast portion joined to said neck opposite its head end and comprising a first prong-deflecting surface extending radially outwardly and upwardly substantially half the distance from the outer extremity of said head to its connected portion with said neck, and a second arcuate radially inwardly directed rim portion which terminates short of said reduced neck to define a prong-receiving opening between said rim edge and said reduced neck, said attaching member being in the form of an annular ring having a series of prongs extending upwardly from its center opening, said method comprising the steps of first positioning the breast end of said stud against one surface of said support and the pointed ends of said prongs against the opposite surface, next forcing the stud and attaching member together to cause said prongs to pierce through said support and bend outwardly along said prong-deflecting surface into said hollow anvil breast portion, and finally forcing said anvil breast portion and prongs therein downwardly to a position where the upper surface of said breast portion will be disposed below a plane passing through the maximum diameter of said head a distance greater than the thickness of the socket material.

5. The method of securing a stud and an attaching member to a support, wherein said stud is adapted for engagement into an opening of a piece of relatively thick hard material considered the socket element of the fastener members, said stud having a resilient head and tapering neck, said stud also having a circumferentially continuous hollow anvil breast portion joined to said neck opposite its head end and comprising a first prong-deflecting surface extending radially outwardly and upwardly from the connected portion of said neck, and a second arcuate radially inwardly directed rim portion which terminates short of said reduced neck to define a prong-receiving opening between said rim edge and said reduced neck, the initial position of the upper surface of said anvil breast portion relative to a plane passing through the maximum diameter of said head being less than the thickness of said socket, said attaching member being in the form of an annular ring having a series of prongs extending upwardly from its center opening, said method comprising the steps of first positioning the breast end of said stud against one surface of said support and the pointed ends of said prongs against the opposite surface, next forcing the stud and attaching member together to cause said prongs to pierce through said support and bend outwardly along said prong-deflecting surface into said hollow anvil breast portion, and finally forcing said anvil breast portion and prongs therein downwardly to a position where the upper surface of said breast portion will be moved away from the plane of the head maximum diameter a distance greater than the thickness of the socket material.

6. The method of securing a stud and an attaching member to a support as defined in claim 5 where during the final operation of the moving of the anvil breast portion downwardly, said breast portion will be collapsed or flattened to substantially embrace the opposite surfaces of said prongs.

References Cited by the Examiner

UNITED STATES PATENTS

| | | | |
|---|---|---|---|
| 2,131,347 | 9/1938 | Fenton | 24—217 |
| 2,310,007 | 2/1943 | Wolff | 29—432.1 |
| 2,371,813 | 3/1945 | Fenton | 29—432.1 |
| 2,468,630 | 4/1949 | Huelster | 24—220 |
| 2,509,434 | 5/1950 | Huelster | 24—216 |

CHARLIE T. MOON, *Primary Examiner.*